United States Patent
Williamson, Jr. et al.

[11] Patent Number: 5,761,823
[45] Date of Patent: Jun. 9, 1998

[54] RELATIVE PLANARITY VERIFICATION APPARATUS AND METHOD OF USE

[76] Inventors: John S. Williamson, Jr., 903 Theresa Ct., Menlo Park, Calif. 94025-1724; Terry A. Pea, 6053 Trigo Ln., Prunedale, Calif. 93907

[21] Appl. No.: 674,962

[22] Filed: Jul. 3, 1996

Related U.S. Application Data

[63] Continuation-in-part of Ser. No. 313,451, Sep. 27, 1994, abandoned.

[51] Int. Cl.[6] ................. G01B 3/22; G01B 5/28
[52] U.S. Cl. .................. 33/832; 33/533; 248/904
[58] Field of Search .................. 33/533, 642, 645, 33/572, 832, 833, 803, 792, 784; 248/904

[56] References Cited

U.S. PATENT DOCUMENTS

| | | | |
|---|---|---|---|
| 715,582 | 12/1902 | Jacobs et al. | 33/533 |
| 1,804,490 | 5/1931 | Bagge | 248/904 |
| 2,310,276 | 2/1943 | Bilz | 248/904 |
| 2,469,904 | 5/1949 | Szuba | 33/832 |
| 2,516,053 | 7/1950 | Farkas | 248/904 |
| 2,660,799 | 12/1953 | Strauss | 33/833 |
| 3,271,871 | 9/1966 | Foscarota | 33/474 |
| 3,939,569 | 2/1976 | Squires | 33/533 |
| 4,554,747 | 11/1985 | Williams | 33/832 |
| 4,751,457 | 6/1988 | Veenendaal | 33/533 |
| 4,774,768 | 10/1988 | Chiponis | 33/533 |
| 5,136,232 | 8/1992 | Gonzales, Jr. et al. | 33/533 |
| 5,358,364 | 10/1994 | Kall | 33/642 |

*Primary Examiner*—Thomas B. Will
*Attorney, Agent, or Firm*—Carol D. Titus; James J. Leary; Patrick T. Reilly

[57] ABSTRACT

An inspection tool for verifying the relative planarity of a flat surface or for verifying whether a first planar surface is parallel to a second planar surface is described. The tool includes a dial indicator on the end of a flexible support arm which is rotatably mounted on a base with a planar bottom surface. The flexible support arm permits the dial indicator to be positioned in contact with the planar bottom surface of the base and the axis of rotation is adjustable with respect to the planar bottom surface which allows the device to be self-calibrating. One application of the device is verifying whether the ring carrier or probe card of a wafer prober is parallel with the wafer probe chuck. The planar bottom surface of the base is placed on the wafer probe chuck and the support arm is rotated with the dial indicator in contact with the ring carrier or the probe card. Any deviation in the dial indicator reading indicates that the surfaces are not parallel. An optional automated data logging system uses an infrared data link to transmit data from the device to a portable computer to record the data.

17 Claims, 7 Drawing Sheets

RELATIVE PLANARITY VERIFICATION APPARATUS AND METHOD OF USE

This application is a continuation-in-part of application Ser. No. 08/313.451 filed Sep. 27, 1994, now abandoned.

BACKGROUND OF THE INVENTION

1. Field of the Invention

The present invention relates to a portable apparatus used to verify the existence of a sufficiently co-planar orientation between a flat surface and a physical feature of an object. The present invention is especially useful in determining the existence of effective parallel planarity between the chuck of an automated wafer prober and a probe card or between the chuck and the top plate or ring carrier used to support and orient the probe card.

2. Background

The manufacture and test of semiconductor devices typically requires the automated handling of extremely thin and uniformly flat silicon or gallium arsenide wafer slices. The electrical testing of semiconductor circuits while still in whole wafer form is a beneficial and routinely conducted step in the manufacture process.

Commercially available automated wafer probing equipment, such as the models currently offered for sale by Electroglas, Tokyo Electron Limited and Tokyo Seimitsu, use a motorized chuck and a probe card mounted onto a head plate or ring carrier.

A typical wafer probing configuration includes an extremely flat motorized chuck onto which a very thin semiconductor wafer is precisely positioned. A probe card is used to make electrical contact with a selected circuit or circuits of the wafer by means of making physical contact with a multiplicity of contact pads arranged in a pre-designated pattern on the wafer. The probe card is typically mounted onto an electro-mechanical interface assembly which in turn is mounted onto a rigidly positioned head plate or ring carrier. The head plate or ring carrier is an essential component of the wafer prober. The electro-mechanical interface extends beyond the wafer prober, and provides electrical signal transmission pathways between the pin electronics of an automatic test system and the wafer under test.

The probe card presents a stable pattern of finely arranged contact points, often located at the ends of metal needles or on top of electrically conductive bumps, and establishes the necessary signal pathways which pass through the electro-mechanical interface and into a semiconductor test system. Probe cards are designed to exhibit low electrical resistance at all points of contact with the circuit or circuits under test. The motorized chuck is used to mechanically present a selected module, device or devices on the wafer directly underneath the probe card contact pattern, and then to drive the wafer up into electrical contact with the contact points of the probe card.

The fragility, economic value and extreme thinness of the wafer material make it important that a tight control be kept on the amount of pressure exerted by the probe card contact points onto any selected circuit. This is typically achieved by the use of probe cards with highly uniform placements of contact points. In an ideal probe card embodiment, all contact points would reside in one plane, would deliver a light and uniform pressure at all contact points with the circuit under test, and would maintain these characteristics over a long life time.

The nature of automated semiconductor testing requires that probe cards of various patterns be exchanged in and out of wafer probers in accordance with the varying geometric patterns of different semiconductor circuit designs. Commercially available wafer prober models typically allow for easy installation and removal of probe card assemblies onto metallic head plates or ring carriers.

The parallel planarity existing within a wafer prober, and between the movable chuck of an automated wafer prober and a properly installed probe card, is thus directly dependent upon the parallel planarity maintained between the chuck and the head plate or ring carrier.

Most semiconductor test departments operate under the financial pressures of mass production. Equipment efficiency is often significantly affected by the length of time required to switch a test system set-up with a wafer prober from testing one device type to testing another. The effective use of a wafer prober is fundamentally dependent by the pre-existing degree of parallel planarity maintained between the wafer chuck and the probe card contact points. The planarity of the probe card in this context is defined by the planarity of the prober's top plate or ring carrier onto which it is either directly or indirectly mounted.

Early developments in small scale integration (SSI) placed relatively mild parallel planarity requirements on a wafer testing system design. A parallel planarity range of ±20 mils over small die sizes was acceptable. Contact problems occurring within this range were compensated for by overdriving chuck by three to six mils vertically into the probe card contact points. Probe cards used at that time were relatively simple to manufacture and inexpensive to replace.

As semiconductor technology moved towards the finer geometries of very large scale integration (VLSI) fabrication, probe cards became more complex. The contact pads presented by each die (or complete circuit) decreased in individual surface area and increased in number. While the number of contacts required per unit area of the wafer has increased, the acceptable level of physical pressure to be applied onto any one pad has decreased.

Smaller contact pads require lighter overdrive and better planarization between the chuck and the probe card to achieve reliable and repeatable electrical contact with the circuit under test.

The increased device complexity made possible by higher scale integration design architectures has resulted in circuits that present contact pad lay-outs along increasingly larger perimeters. Improvements in the performance capabilities of commercially available semiconductor test systems allows the manufacturer to perform effective electrical test these more complex and higher pin count (i.e. higher contact pad count) devices and modules.

The availability of higher pin-count test systems has also made possible the test of more than one circuit per contact, or touch-down, between the probe card and the wafer. The testing of eight or more die per touch-down has become quite common in small pin count ASIC designs. Simultaneous wafer testing of 16 and 32 RAM or ROM devices has also become quite routine.

The drive towards multiple circuit testing per touch-down has also been driven in part by the reduction in test times required by conventional semiconductor test systems. The time required to precisely position the wafer in relation to the probe card is referred to as the index time. As test times have decreased, index times have become a more significant limiting element to cost effective testing throughput. Multiple die testing is thus an economically attractive alternative to single die testing.

The resulting requirements for probe cards with high count contact point patterns over greater lengths and widths has increased the physical dimensions over which finer absolute deviations are acceptable. Probe cards having over 500 contact points, and probe cards with contact point pattern perimeters on the order of two square inches are becoming increasingly common. Planarization tolerances of such probe cards are typically on the order of 0.5 thousands of an inch over the entire contact point pattern.

A thoughtful list of potential sources of planarization error should thus include misorientation of the contact points of the probe card, deviations from planarity within the electrical interface assembly, and a lack parallel planarity between the chuck and the top plate or ring carrier of the wafer prober.

Maintainable precision co-planar placement of the probe card contact points with the wafer prober permits faster wafer test processing, accurate electrical test results, and longer probe card lifetimes.

In view of these functional requirements and in consideration of the demanding environmental stresses placed on equipment used at a semiconductor testing site, a portable, rugged and self-adjustable tool is provided which is inexpensive to manufacture and easy to use, and easy to train to use, and can be quickly applied to visually verify the relative planarity of a designated flat surface and physically proximate object features.

SUMMARY OF THE INVENTION

It is an object of the present invention to provide an apparatus to allow an operator to verify the relative planarity existing between a flat surface and a designated feature of a physical object.

In accordance with a first embodiment of the present invention, a base and a plate are provided. The base and plate are connected at three points. The first connection point existing between the base and the plate includes a ball pivot. This ball pivot connection point allows the base and the plate to rotate freely along all three physical axes.

The remaining two connection points constrain the movement of the base and plate to linear motion along one axis, and rotational motion about the other two physical axes. These two connection points consist of an adjustment screw with a spring resist. The spring resists are permanently connected on one end to a side of the plate, and the remaining end of each of the two spring resists is connected to a side of the base.

The ball pivot connection point is non-adjustable, while the remaining two points are adjustable. All three of the connection points connect the same preselected side of the plate to one preselected side of the base. The springs of all three connection points serve to pull the base and the plate as closely together as the ball pivot and the adjustment screws will allow.

The freedoms of motion allowed by the two adjustable connection points in typical wafer prober applications (either in calibration or in operation mode) are vertical linear motion and rotational motion about both the X and the Y axes.

Each of the two adjustment screws of the adjustable connection points consists of an accessible thumb wheel affixed to a threaded screw shaft. An operator may adjust the relative orientation of the base to the plate by turning the thumb wheels, thus increasing or decreasing the length of threaded screw shaft maintained at the two adjustable connection points between the base and the plate.

The plate has a circular hollow center. The plate comprises a hollow center is located around a tubular axle. In certain preferred embodiments an interior portion of the hollow center of the plate is in intimate physical contact with a segment of the exterior side of the tubular axle.

The tubular axle comprises a grooved end and a threaded end.

The grooved end comprises a circular groove used to hold a snap ring in place. The groove end is distal to the base, and the threaded end is proximal to the base. This groove is oriented in a plane that is normal to the centerline axis of the axle.

A first, circular, thrust bearing assembly is seated around the axle. The first thrust bearing assembly consists of an inner race, tapered or conical roller bearings, and an outer race. The inner race is in contact with the snap ring, which is located in the groove of the grooved end.

A rigid shell is also seated around the axle. This shell comprises a body and a shelf. The shelf is located in the interior of the shell, and includes a top ledge and a bottom ledge. The top ledge is in contact with the outer race of the first thrust bearing along the entire circumference of the first thrust bearing.

A second, circular, thrust bearing assembly is also seated around the axle. The outer race of the second thrust bearing assembly is in contact with the bottom ledge of the shell shelf. The inner race of the second thrust bearing assembly is in physical contact with the plate.

A circular threaded nut is located on the threaded end of the axle. This threaded nut is in intimate physical contact with the side of the plate proximate to the base. The threaded nut and snap ring hold the plate, shell, and first and second thrust bearings together and maintain their physical contact under compression.

A cover is attached to the grooved end of the axle. This cover comprises a side distal to the groove and a side proximal to the groove.

The side of the cover distal from the groove is, in certain preferred embodiments, rigid and planar. Alternate preferred embodiments of the present invention comprise cover designs which include various distal cover sides of non-planar shapes.

A support arm is rigidly connected to the shell body. The support arm includes rigid links connected at pivot and swivel points. The link most distal from the shell is firmly connected to and supports a dial indicator. The dial indicator comprises a body and an attached spring loaded arm assembly. The spring loaded arm assembly comprises an attachment end and a distal end. The attachment end pivotally attaches the spring loaded arm to the body of the dial indicator. The distal end comprises a ball element.

In certain preferred embodiments the dial indicator determines physical measurements by mechanical means. In alternate preferred embodiments of the present invention the dial indicator determines physical measurements by electronic means.

In certain preferred embodiments of the present invention the dial indicator comprises a multiplicity of attachment sites. The operator can attach and uncouple the dial indicator to the support arm at any of these attachment sites. This feature allows the operator to select the mechanical orientation of the dial indicator to the support arm which is most appropriate to verifying the planarity of the selected features of a specific object.

In certain preferred embodiments of the present invention an adjustment arm is located near the body of the dial indicator which allows for fine adjustment of the attitude of the indicator body by an operator while the spring loaded arm assembly is exerting pressure against a physical feature of an object.

In certain preferred embodiments of the present invention the spring loaded arm assembly further comprises a slip clutch attached between the spring loaded arm and the body of the dial indicator which reduces the potential for damage to the dial indicator during normal operation.

The base comprises a side which is restrained by the connection points, and at least one additional planar side. In operational mode, a planar side of the base is placed onto a flat surface. The ball element of the spring loaded arm assembly of the dial indicator is placed in contact, while under tension, with a feature of a physical object. The shell is then rotated through an arc of sufficient magnitude while the operator visually observes the dial indicator for deviations detected by the spring loaded arm assembly.

In calibration mode, the distal side of the cover is physically secured by the operator. In certain preferred embodiments comprising a rigid planar distal cover side, the distal side of the cover is placed on a stable surface. The ball element of the spring loaded arm assembly of the dial indicator is placed in contact and under compression with a specific planar side of the base. The base and attached axle are then rotated around an axis roughly perpendicular to the plane established and maintained by the thrust bearings while the operator observes the dial indicator for deviations. The thumb wheels of the two adjustable connection points are used to bring the specific planar surface of the base into an orientation wherein the axis of rotation of the axle is perpendicular to the specific planar side of the base.

At the conclusion of a properly executed calibration protocol, the specific planar side of the base is set and rigidly held to rotate about an axis which is very closely perpendicular to the plane established and maintained by the thrust bearings.

The present invention is useful in verifying the parallel planarity relative to a wafer prober chuck, or any stable flat surface, to a head plate or ring carrier of a wafer prober, to an electro-mechanical interface installed into a wafer prober, and to a probe card rigidly attached to a head plate, a ring carrier, or an electro-mechanical interface assembly.

The present invention allows for the design and manufacture of a variety of embodiments that are individually suited to the physical dimensions most suited to particular applications. Certain preferred embodiments of the present invention are manufactured in cost effective ways by requiring the use of widely available raw materials and commercial parts.

DETAILED DESCRIPTION OF A PREFERRED EMBODIMENT

The following detailed description of the present invention is meant to be illustrative only and not limiting. Other embodiments of this invention will be obvious to those skilled in the art in view of the following disclosure.

Figure 1:
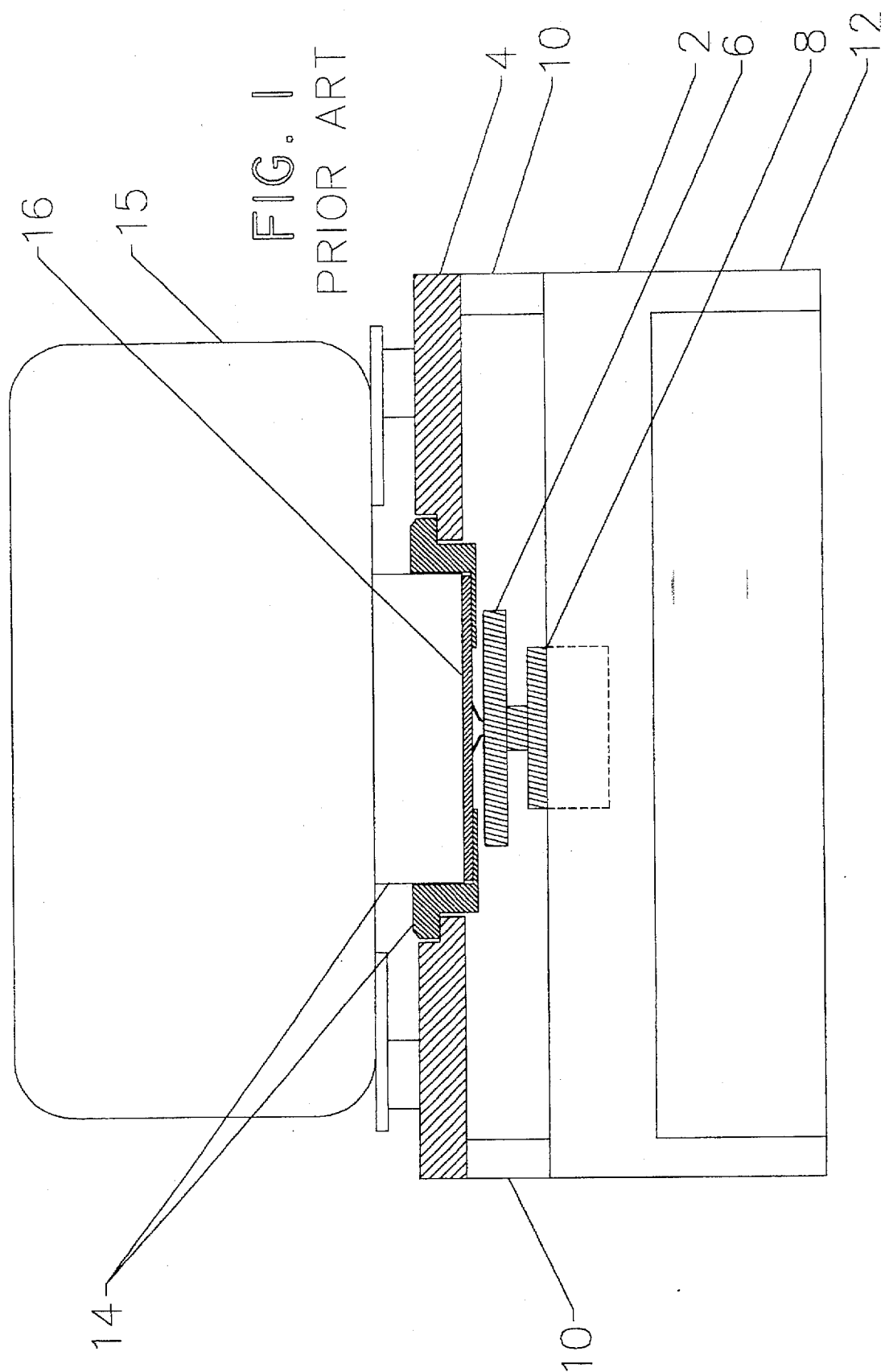
FIG. 1 is an illustration of a common style of an automated wafer prober design.

Referring to FIG. 1 there is illustrated a typical wafer prober design. Wafer prober 2 includes ring carrier 4, chuck 6, motor assembly 8, adjustment posts 10, wafer prober base 12, and test head 15.

Motor assembly 8 moves chuck 6 in relation to ring carrier 4. The planarity of ring carrier 4 is adjustable by means of adjusting the individual and separate heights maintained by adjustment posts 10 between ring carrier 4 and wafer prober base 12. These adjustments of adjustment posts 10 can not, of course, be accomplished during normal operations of the wafer prober, as when test head 15 is present and electrically connected to electro-mechanical interface 14.

Electro-mechanical interface 14 is shown as installed into ring carrier 4. Probe card 16 is shown to be installed onto electrical interface 14.

Figure 2:
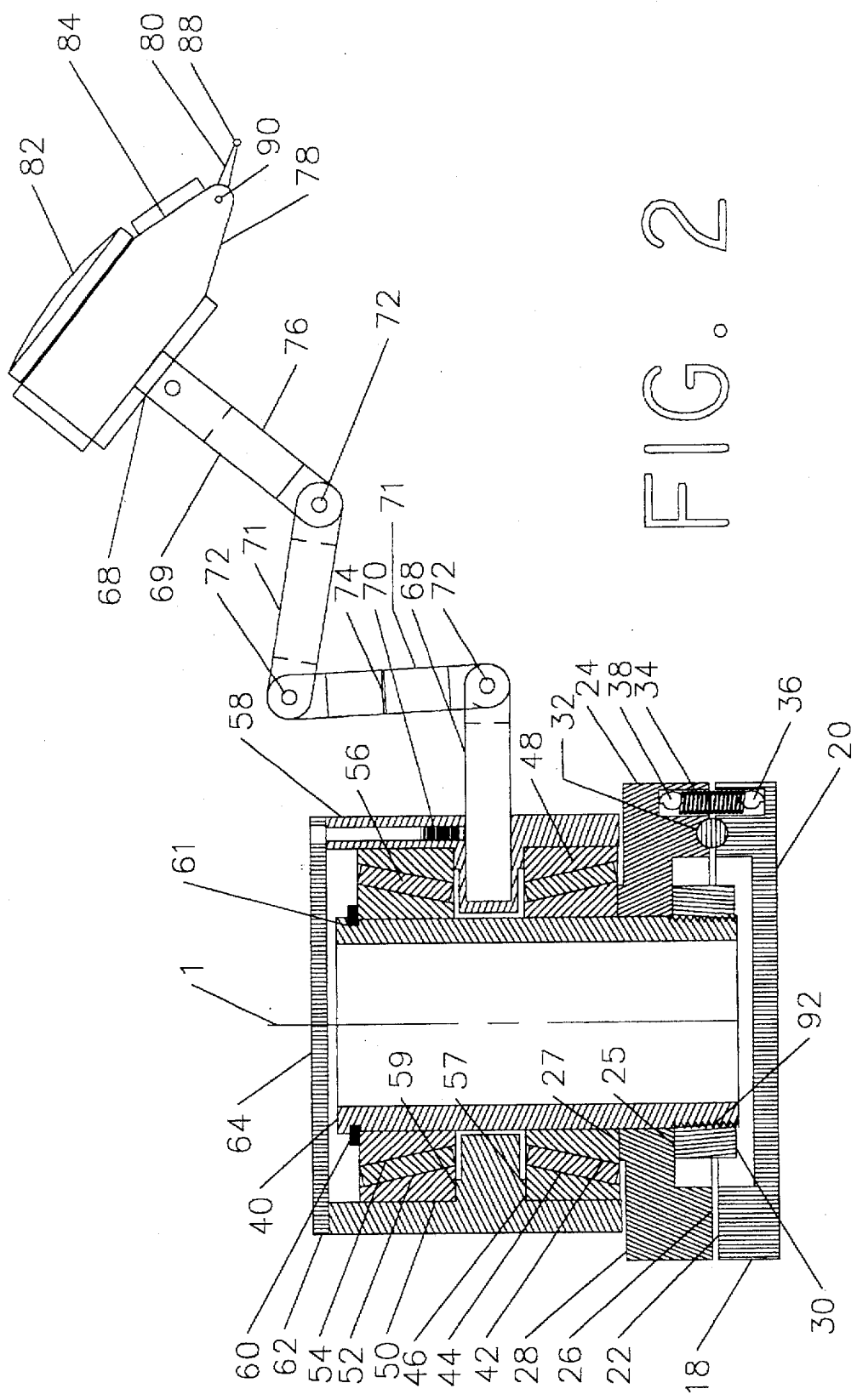
FIG. 2 is a cross-sectional illustration of a preferred embodiment of the planarity verification tool of the present invention.

Referring now to FIG. 2, there is shown a cross-sectional view of a preferred embodiment of the planarity verification tool of the present invention. Base 18 comprises a base planar side 20 and a base connection side 22.

Figure 3:
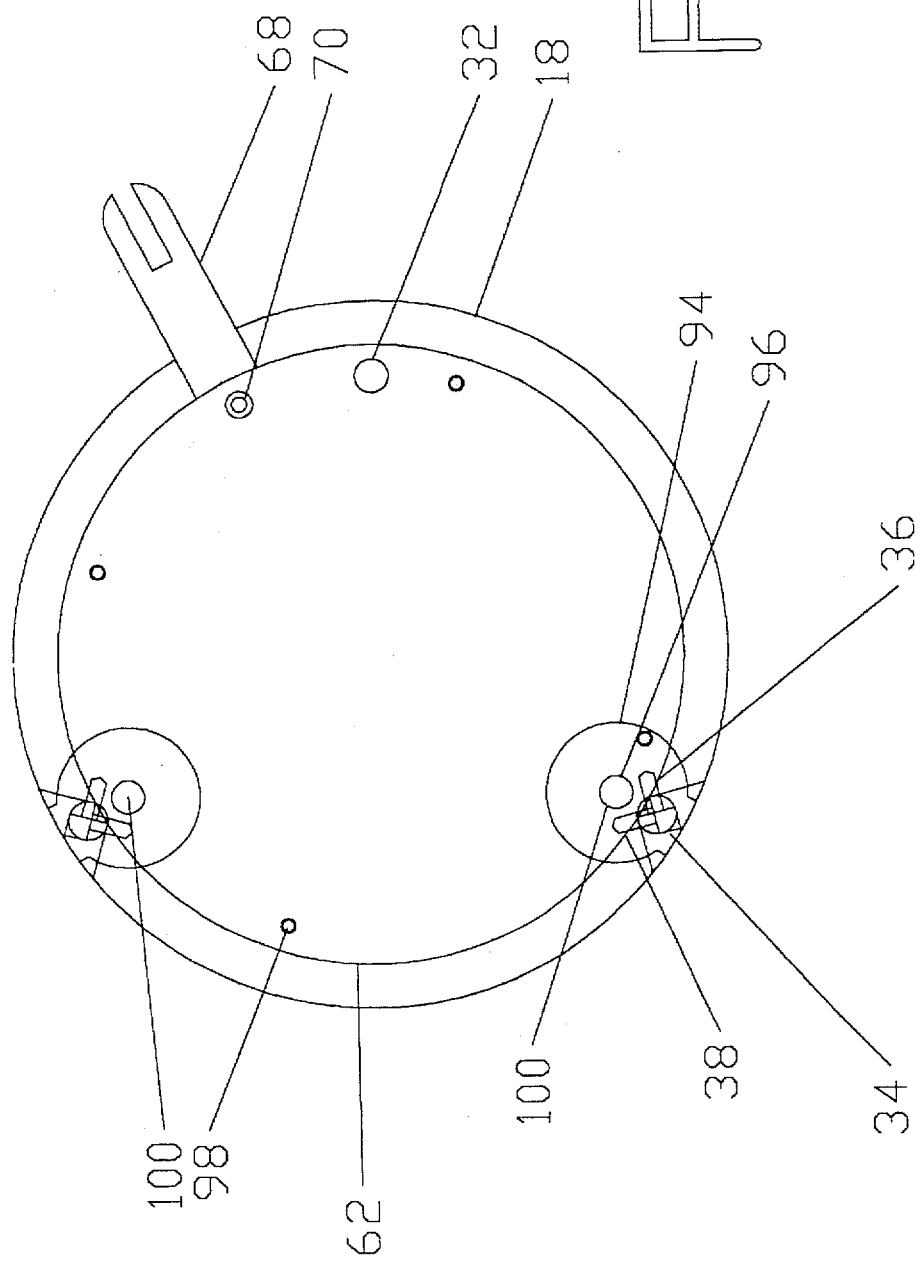
FIG. 3 is a partial top view of a preferred embodiment of the present invention.

Plate 24 comprises plate connection side 26, plate mount side 28, nut surface 25 and bearing surface 27. Base connection side 22 is connected to plate connection side 26 at ball pivot 32 and at adjustable connection points 100. (Adjustable connection points 100 are shown in FIG. 3).

Spring 34 is connected to base 18 by spring set screw 36. Spring 34 is connected to plate 24 by spring set screw 38. Spring 34 is in tension and compresses base 18 and plate 24 together. As will be described in FIG. 3, additional springs at adjustable connection points 100 provide additional application of spring generated force which is used to compress base 18 and plate 24 together.

Axle 40 passes through a hollow area of and central to plate 24. Axle 40 comprises a groove 61, and a threaded end 92. Plate 24 is held in place and under compression by nut 30. Nut 30 is circular and is screwed into place at axle threaded end 92. Nut 30 compresses against the plate nut surface 25 of plate 24.

Plate bearing surface 27 of plate 24 presses against inner race 42 of thrust bearing 48. Thrust bearing 48 comprises inner race 42, conical bearing assembly 44 and outer race 46.

Inner race 42 presses against conical bearing assembly 44. Conical bearing assembly presses against outer race 46. Outer race 46 presses against shell 58 at lower surface 57. Shell 58 comprises lower surface 57 and upper surface 59. Upper surface 59 presses against outer race 50 of thrust bearing 56.

Thrust bearing 56 comprises outer race 50, conical bearing assembly 52 and inner race 54. Outer bearing 50 presses against conical bearing assembly 52. Conical bearing assembly 52 presses against inner race 54. Inner race 54 presses against snap ring 60. Snap ring 60 is held in place by groove 61.

The compression force created and maintained by the installation of nut 30 into axle threaded end 92 and the seating of snap ring 60 into groove 61 of axle 30 is used to insure that the axis of rotation of shell 58 is constant with respect to the centerline 1 of axle 30.

In certain preferred embodiments of the present invention thrust bearings comprising ball bearing mechanisms are used in place of conical roller bearing assemblies.

Support arm 69 comprises first link 68, intermediate links 71, pivot points 72 and dial indicator connection link 76. First link 68 is rigidly attached to shell 58 and held in place by support arm set screw 70. A multiplicity of pivot points 72 and intermediate links 71 connect first link 68 to connection link 76. Swivel point 74 is located on an intermediate link 71, and allows rotation of one segment of a link about an axis which runs along the length of the entire link.

Connection link 76 grasps and supports dial indicator 78 at attachment point 86. Dial indicator 78 comprises dial 82, spring loaded arm 80, dovetail attachment point 86, dial indicator body 84, and spring loaded arm attachment point 90.

Spring loaded arm 80 is pivotally attached to dial indicator body 84 at attachment point 90. Spring loaded arm 80 further comprises ball 88.

Certain preferred embodiments of the present invention allow dial indicator attachment point 86 to move along the identical degrees of freedom as allowed at a pivot point 72. Certain alternate preferred embodiments of the present invention allow the dial indicator attachment point 86 to move along the identical degrees of freedom as allowed at a swivel point 74.

Various alternate preferred embodiments of the present invention comprise none, one, two, or multiplicities of swivel points 74 and pivot points 72.

Alternate preferred embodiments of the present invention further comprise a slip clutch connected to spring loaded arm 80 and dial indicator body 84, whereby the potential for damage to dial indicator 78 is greatly reduced.

Alternate preferred embodiments of the present invention further comprise a manual adjust lever connected to dial indicator 78, whereby an operator safely, precisely and directly adjusts the position of the dial indicator body 84 in relationship to connection link 76.

Referring now to FIG. 3, a partial top view of a preferred embodiment of the present invention is illustrated. Cover 62 is attached to shell 58 at attachment points 98. Cover 62 encloses the internal rotating elements of the present invention and protects these elements from contamination.

Ball pivot 32 comprises a spherical ball bearing. Adjustment points 100 each comprise a thumb wheel 94, an adjustment screw 96, spring 34, spring set screws 36 and 38. Spring 34 is connected to base 18 by spring set screw 36. In addition, spring 34 is connected to plate 24 by spring set screw 38. Spring 34 is in tension and compresses base 18 and plate 24 together.

Each thumb wheel 94 is connected to an adjustment screw 96 and allows the operator to precisely select and firmly set the distance to be maintained between plate 24 and base 18 at each adjustment point 100. Spring 34 is connected to both plate 24 base 18. Spring 34 thus insures that plate 24 and base 18 are firmly drawn together, at each adjustment point 100, as close as each adjustment screw 96 will allow.

The operator controls the perpendicularity existing between the axis of rotation of the shell 58 and the planar side 20 of the base 18 by means of varying the settings of adjustment points 100.

Figure 4:
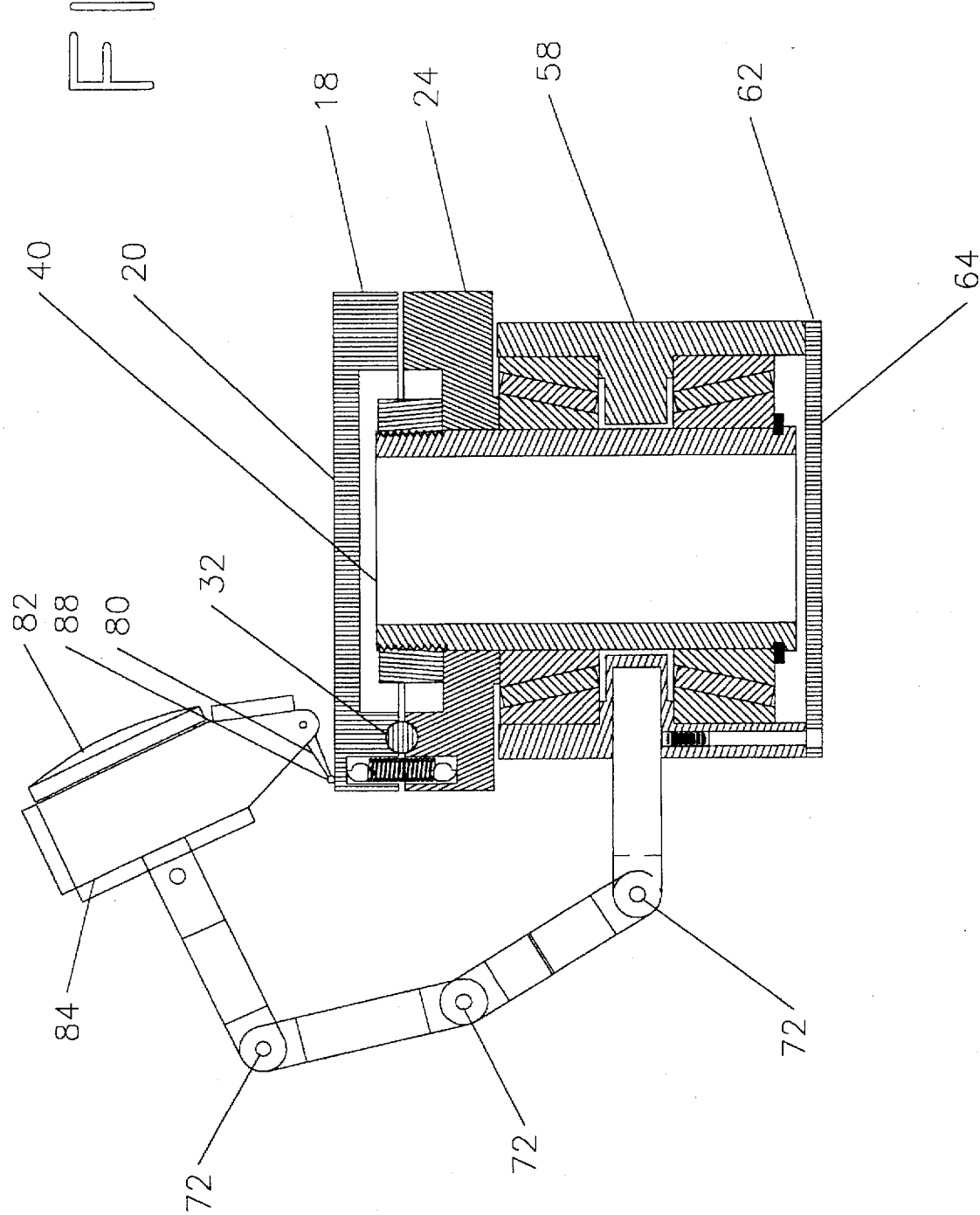
FIG. 4 is a depiction of a preferred embodiment of the present invention in calibration mode.
Figure 5:
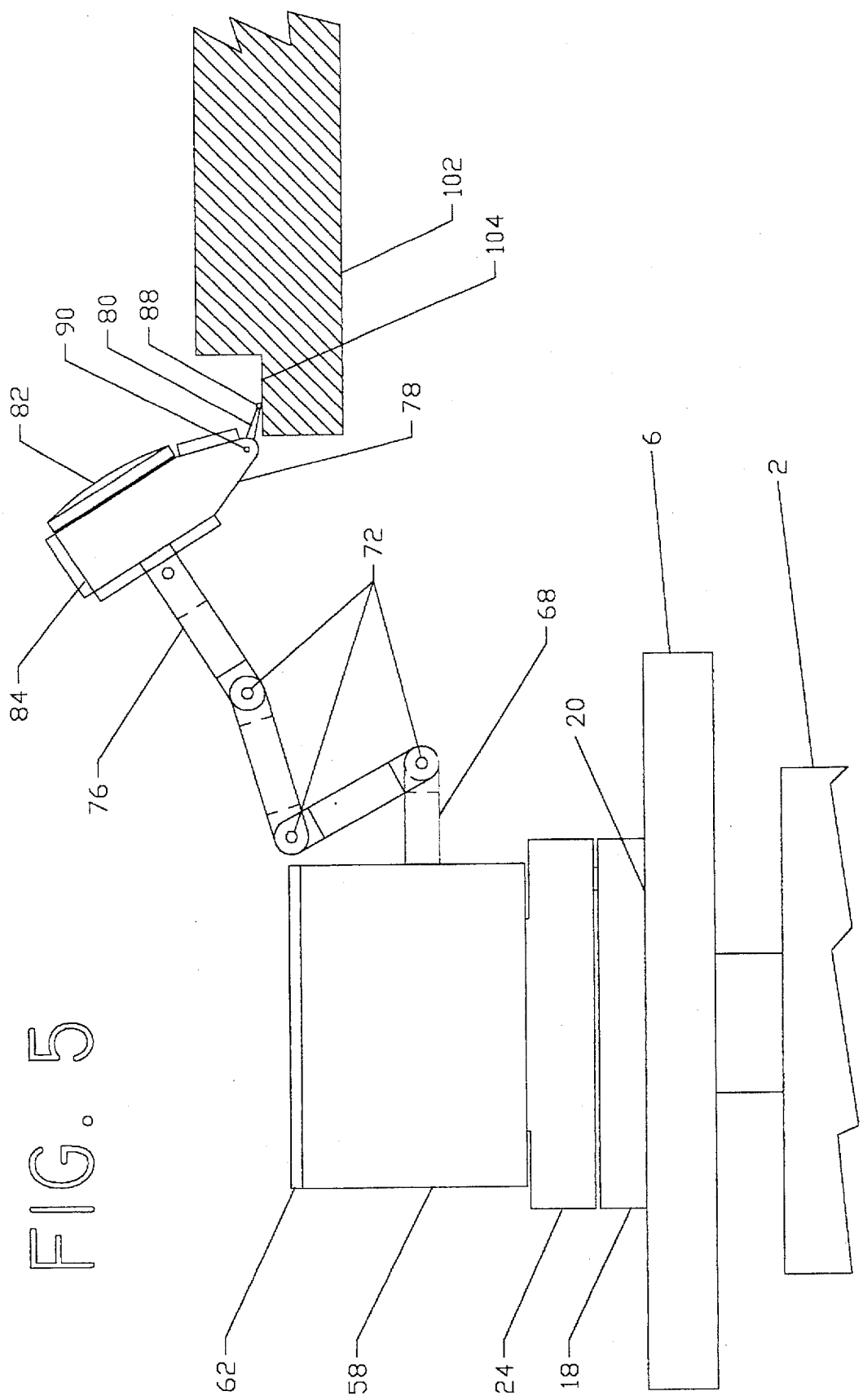
FIG. 5 is a depiction of a preferred embodiment of the present invention in operation mode.
Figure 6:
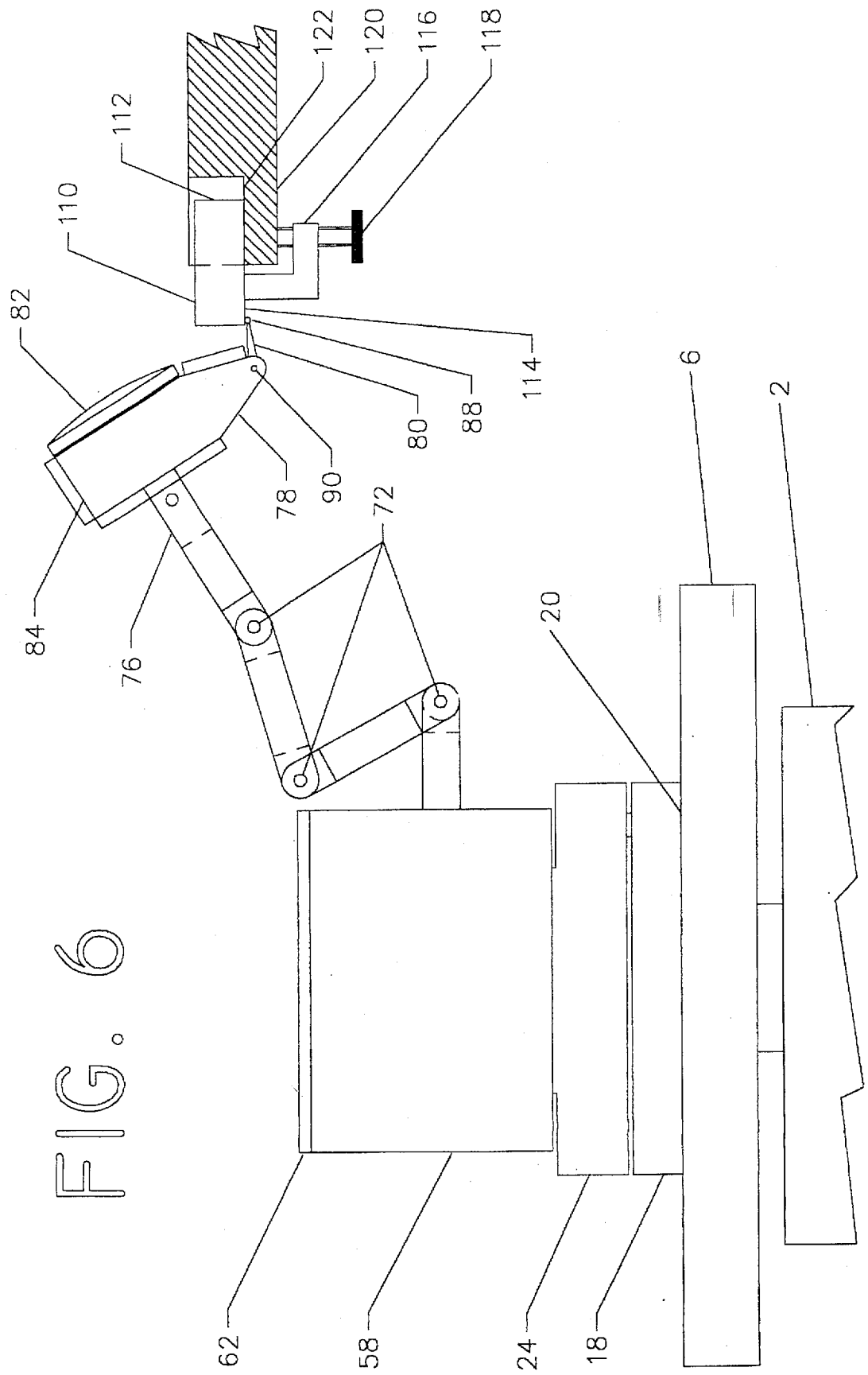
FIG. 6 is an illustration of a reference position extension module in physical contact with a dial indicator.

Detailed descriptions of FIGS. 4, 5 and 6 are found in the section following.

Method of Operation

Moving on to consider FIG. 4, there is shown a preferred embodiment of the present invention in calibration mode. The preferred embodiment illustrated comprises a planar cover side 64. Alternate preferred embodiments of the present invention comprise non-planar designs of cover side 64.

The entire apparatus is placed on a stable surface with the planar cover side 64 down and the base planar side 20 up. Ball 88 of spring loaded arm 80 is placed in physical contact with base planar side 20. A point located on base planar side 20 and immediately above the ball pivot 32 is typically used as the starting point for the following segment of the calibration of the present invention.

The dial indicator body 84 is positioned so that the dial reading of dial 82 is at mid-scale when ball 88 is in physical contact with a point of base planar side 20 proximate to pivot ball 32 The base 18 is then rotated so that the ball 88 is located at a point proximate to either of the adjustable connection points 100. If adjustment is necessary, the thumb wheel 94 of the selected adjustable connection point 100 is then moved in order to change the distance maintained between base 18 and the plate 24. This distance is changed (by means of adjusting thumbwheel 94) until the dial reading of dial 88 returns to the reading as originally set at that location of base planar side 20, and proximate to ball pivot 32, where the mid-range setting had been earlier established.

Base 18 is next rotated to bring a point proximate to the remaining adjustable connection point 100. If adjustment is necessary, the thumb wheel 94 of the selected adjustable connection point 100 is then moved in order to change the distance maintained between base 18 and the plate 24. This distance is changed (by means of adjusting thumbwheel 94) until the dial reading of dial 88 returns to the reading as originally set at that location of base planar side 20, and proximate to ball pivot 32, where the mid-range setting had been earlier established.

The base 18 is then rotated until a point proximate to the ball pivot 32 is placed under the ball 88. The dial indicator body 84 orientation to the base 18 is then established again by the operator by means of placing the dial indicator body 84 in a position that results in a mid-range dial reading of dial 82. Both of the adjustable connection points are again checked and adjusted as according to the steps described above in this section. These steps, including the repositioning of dial indicator body 84 to a point of the base 18 proximate to the ball pivot 32, are repeated until the operator is satisfied with degree of perpendicularity achieved between the axis of rotation of shell 58 and the base planar side 20.

This degree of perpendicularity is the fundamental basis upon which the present invention determines the precise degree of parallel planarity existing between a flat surface and a proximate object.

Referring to now FIG. 5, there is shown a preferred embodiment of the present invention in operation mode. The entire apparatus is placed on the flat surface of chuck 6 of wafer prober 2 with the base planar side 20 down and the cover 62 up. Ball 88 of dial indicator 78 is placed in physical contact with a point on object 102. An object feature reference point 104 is chosen by the operator. Reference point 104 can be selected from somewhere along the portion of ring carrier 4 where the electro-mechanical interface 14 is to be installed. Reference point 104 is thus selected for use as the starting point for the following segment of the operation of the present invention.

The dial indicator 78 is positioned so that the dial reading of dial 82 is at mid-scale when the ball 88 is in physical contact with the reference point 104. The shell 58 is then rotated so that the ball 88 is located at a point proximate to one of the adjustment posts 10. If adjustment is necessary, adjustment post 10 is then adjusted in order to change the distance maintained between wafer prober base 12 and the ring carrier 4. The distance maintained by the selected adjustment post 10 is then varied until the dial reading of dial 82 is approximately mid-range, and roughly equal to the original setting found at the selected reference point 104.

All remaining adjustment posts 10 are examined and modified as described in the preceding paragraph. Dial indicator 78 is then returned to reference point 104, where the ball 88 is again placed in physical contact with to reference point 104. The position of dial indicator 78 is again established so the dial reading of dial 82 is at mid-range when the ball 88 is in physical contact with reference point 104.

The steps described in the preceding two paragraphs are repeated until the operator is satisfied with degree of parallel planarity achieved between the chuck 6 and the ring carrier 4.

The description above of the operation mode of present invention described in reference to FIG. 5 has considered the case of a ring carrier 4 without any portion of either probe card 16 or electrical interface 14 installed. It is again noted that the present invention is also used to check the planarity of either electro-mechanical interfaces or probe cards as installed into and for use with an automated wafer prober.

Referring finally to FIG. 6, there is shown a preferred embodiment of the present invention further comprising a reference position extension module 110 in contact with a dial indicator 78.

Extension module 110 is most typically used where some portion or portions of the object to be verified for parallel planarity with the designated flat surface (upon which the base 18 of the present invention is placed) are not easily accessible to by the dial indicator 78. In such cases, or in any cases where an operator so chooses, an extension arm 110 is mounted onto the object at an appropriate point.

Extension module 110 comprises body 112, surface 114 arm 116 and thumb screw 118.

In the case illustrated in FIG. 6, an inaccessible reference point 122 of an object 120 has been selected as an installation point for extension module 110. Compression force applied by thumbscrew 118 and body 112 holds extension module 110 rigidly in place, and extends the height position of reference point 122. The design of extension module 110 allows for the surface 114 to be used as the reference plane for the dial indicator 78.

The operation mode of the present invention combined with the use of extension module or modules 110 is identical to as described previously in this section.

Planarity Verification Tool with Automated Data Logging System

Figure 7:
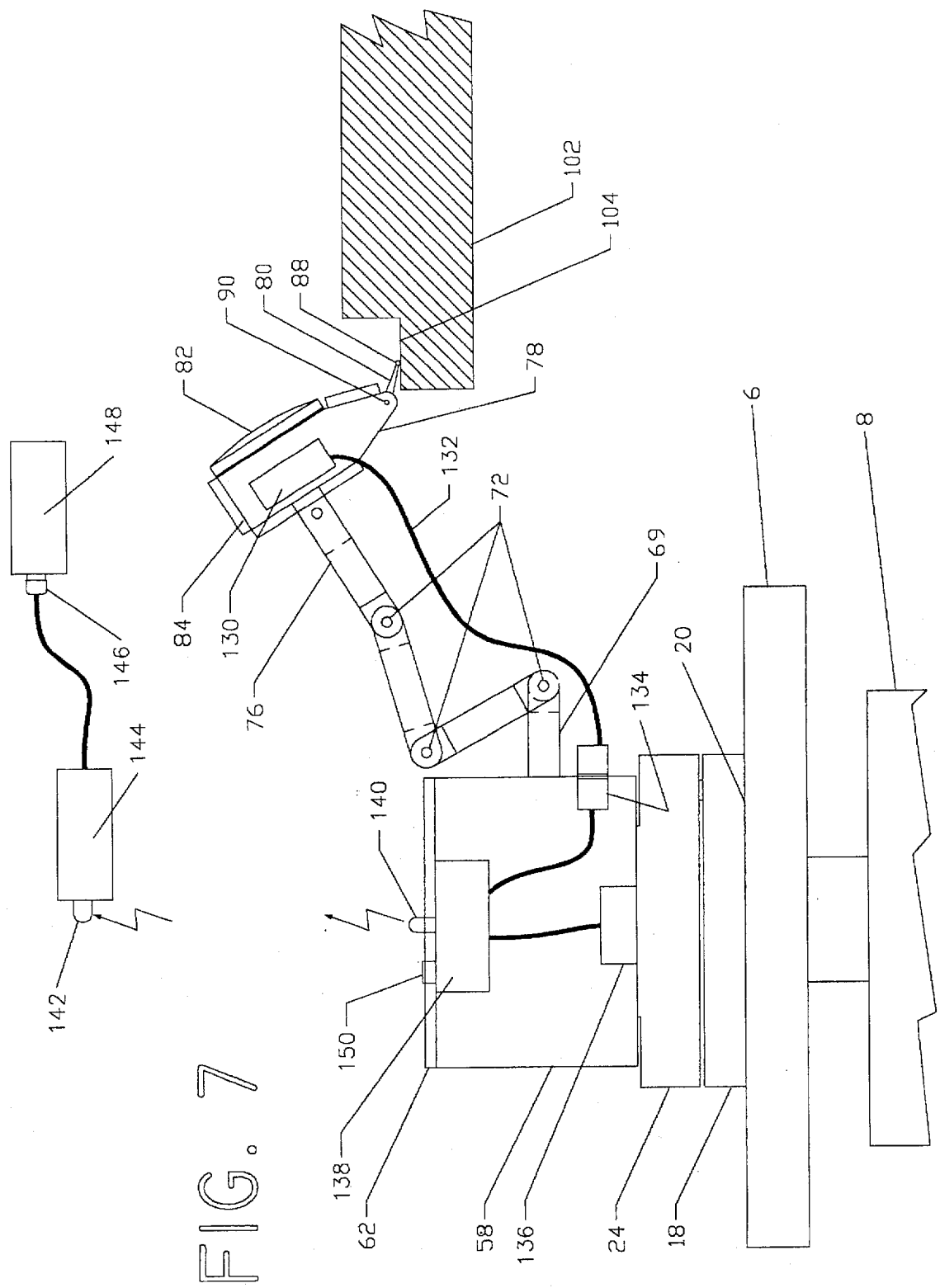
FIG. 7 is a schematic representation of the planarity verification tool of the present invention incorporating an automated data logging system.

FIG. 7 shows an embodiment of the planarity verification tool of the present invention with an additional automated data logging feature. The purpose of this feature is to allow the data to be logged automatically while the user is rotating the tool and allows the user to focus on making the measurement without the distraction of recording the data while verifying the planarization between the chuck and the head plate of the wafer prober. The utility of this refinement of the planarization tool became apparent while making planarization measurements with a test head at different positions. The test head was attached to the head plate and it was found that the weight of the test head could warp the head plate as the test head changed positions. Because of this, it is important that the planarity measurements be made with the test head in the appropriate operating position. When the head plate is in operating position, it is very difficult to see the dial indicator, let alone read its value.

The automated data logging system uses a dial indicator 78 having electronics 130 capable of generating a digital or analog data output indicative of the position of the spring loaded arm 80 with respect to the dial indicator body 84. A dial indicator with output in either metric units (millimeters) or English units (inches) can be used, or the dial indicator 78 can be selectively switchable from metric to English units according to the preference of the user. The readings will be reported to within the resolution of the dial indicator selected. The metric resolution should be at least 25 microns and the English resolution should be at least one mil. A connector cable 132 connects the dial indicator electronics 130 to an electrical connector 134 mounted on the shell 58 of the planarity verification tool close to where the support arm 69 of the dial indicator 78 is mounted. The electrical connector 134 directs the data output of the dial indicator 78 to a data transmitter 138 which is mounted within the shell 58.

A rotary encoder 136 or equivalent rotary position transducer measures the angle of rotation of the shell 58 of the planarity verification tool with respect to the base 18 and generates a digital or analog data output indicative of the angle of rotation in degrees with a resolution of at least a tenth of a degree. The data output of the rotary encoder 136 is directed to the data transmitter 138.

The data transmitter 138, which is mounted within the shell 58, pairs the data output of the dial indicator 78 and the rotary encoder 136 into data sets and generates a combined data signal for transmission to a data receiver 144. The data transmitter 138 may transmit the data as an optical signal, an ultrasonic signal, an FM radio signal, or as a digital electronic signal over a cable connection to the data receiver 144. In one preferred embodiment, the data transmitter 138 uses an infrared data link to transmit the data to the data receiver 144. An infrared LED 140, preferably mounted atop the shell 58, generates a digitally encoded infrared signal which is received by an infrared photodetector 142, such as an infrared photodiode or phototransistor, on the data receiver 144. If desired, the infrared data link can be configured for two-way data transmission by placing an additional infrared LED on the data receiver 144 for transmitting an infrared signal to another infrared photodetector mounted on the planarity verification tool. The data transmitter 138 also includes a push-button momentary switch 150 for initiating an electronic reference marker signal, the function of which will be explained below.

The data receiver 144 has a connector 146, such as a standard RS-232 connector, for transferring the data received to a computer 148, such as a handheld, portable or laptop computer. Alternatively, the data receiver 144 may be integrated directly into a handheld, portable or laptop computer.

Preferably, the automated data logging feature of the planarity verification tool is battery powered for portability and convenience.

Method of Operation

After calibration by the method described above in reference to FIG. 4, the planarity verification tool of FIG. 7 is placed with the base planar side 20 down on a wafer prober chuck 6 or other surface to be measured and the data receiver 144 is placed in relatively close proximity to the planarity verification tool to receive the data signal from the data transmitter 138. If the planarity verification tool uses an infrared data link to transmit the data, the data receiver 144 should be placed so that it has a direct line of sight to the infrared LED 140 of the data transmitter 138.

To initiate the planarity measurement, the user places the ball 88 on the end of the spring loaded arm 80 of the dial indicator 78 in contact with the surface of the object to be measured 102 (e.g. the ring carrier 4, probe card 16 or electrical interface 14 in FIG. 1), then depresses the pushbutton momentary switch 150. This causes the planarity verification system to send a reference data set from the data transmitter 138 to the data receiver 144. The reference data set includes the angular position of the rotary encoder 136, the reading of the dial indicator 78, and the electronic reference marker signal. The electronic reference marker signal is used to correlate the initial position of the support arm 69 and the dial indicator 78 with a reference point 104 on the object 102 or elsewhere on the wafer prober.

Next, the user rotates the shell 58 of the planarity verification tool to swing the support arm 69 and the dial indicator 78 in an arc. With every one-tenth of a degree change in the angular position of the rotary encoder 136, the data transmitter 138 generates a data set which includes the angular position of the rotary encoder 136 and the reading of the dial indicator 78. The data receiver 144 captures the data, translates the data into a standard RS-232 format and relays it to the computer 148 for data logging. A data acquisition program running on the computer 148 takes the RS-232 data, formats it appropriately and records the data to a file.

In one preferred embodiment of the invention, the data would be transmitted from the data transmitter 138 to the data receiver 144 and logged on the computer 148 as a series of data sets in the following format: first the rotary encoder reading, followed by a comma, then the dial indicator reading followed by an M or an E to indicate whether the reading is in metric or English units, followed by another comma and a letter or letters to indicate the reference marker signal, when appropriate, followed by a carriage return and a line feed character set. For example, a reference data set would have the following format:

002.9, 0.008E, REF<CR><LF> and a non-reference data set would have the following format:

182.3, 0.012E<CR><LF>

The automated data logging system allows rapid gathering of planarity data to determine whether the chuck 6 of the wafer prober and the object measured 102 are parallel. If the chuck 6 of the wafer prober and the object measured 102 are found to be out of parallel, appropriate adjustments are made, as described above in reference to FIG. 5, until the planarity verification tool indicates acceptably parallel planarity between the chuck 6 and the object measured 102.

Although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

What is claimed is:

1. A parallel planarity verification tool, comprising:
a base, comprising a base planar side and a first connection side;
a plate, comprising a second connection side and an axle side;
a pivot connection point, said pivot connection point mechanically connecting said first connection side and said second connection side;
a first adjustable connection point and a second adjustable connection point, said first adjustable connection point mechanically and adjustably connecting said first connection side and said second connection side, and said second adjustable connection point mechanically and adjustably connecting said first connection side and said second connection side, wherein an operator adjusts said first adjustable connection point and second adjustable connection point in order to precisely align and rigidly set the orientation of said axle side to said base planar side;
an axle, said axle comprising a threaded end, a snap ring groove and an axle body;
a snap ring located in said snap ring groove;
a shell, said shell comprising a top side, a bottom side and a shelf, said bottom side located towards said axle side, and said top side located distal from said axle side, and said shelf located between said top side and said bottom side;
said shelf comprising a top ledge and a bottom ledge;
a first thrust bearing assembly comprising a first inner race, a first bearing assembly and a first outer race, said first thrust bearing assembly placed around said axle, and said first outer race maintained in intimate physical contact with said bottom ledge of said shelf;
a threaded nut, said threaded nut screwed into said threaded end of said axle, and said threaded nut maintaining said plate in intimate physical contact with said first inner race;
a second thrust bearing assembly comprising a second inner race, a second bearing assembly and a second outer race, said second thrust bearing assembly placed around said axle, and said second outer race maintained in intimate physical contact with said top ledge of said shelf and said second inner race maintained in intimate physical contact with said snap ring, whereby a compressive force is applied and maintained by said nut and said snap ring against said first thrust bearing assembly, said second thrust bearing assembly and said ledge of said shell;
a support arm rigidly attached to said shell, whereby said support arm rotates in unison with said shell;
a dial indicator comprising a dial, a dial indicator body, and a spring loaded arm, said dial indicator pivotally attached to said support arm.

2. A planarity verification tool, comprising:
a base, having a connection side and a planar side,
a rotating element,
an adjustable connection means, said adjustable connection means adjustably connecting said connection side of said base to said rotating element,
an axle having an end, said end of said axle located adjacent said base,
a shell, said shell having a top and a bottom, said rotating element projecting from said shell and said base being adjacent said bottom of said shell,
a shelf, said shelf located between said top and said bottom of said shell,
said shelf comprising an upper surface and a lower surface, a first thrust bearing assembly comprising a first race, a bearing assembly and a second race, said first thrust bearing assembly placed around said axle, said first race adjacent said axle and said second race is maintained in intimate physical contact with said lower surface of said shelf, and a second thrust bearing assembly comprising a first race, a bearing assembly and a second race, said second thrust bearing assembly placed around said axle, and said first race is adjacent said axle and said second race is maintained in intimate physical contact with said upper surface of said shelf, wherein said adjustable connection means allows an axis of rotation of said rotating element to be adjusted into perpendicular relationship with said planar side of said base, said planarity verification tool having an operational mode wherein said planar side of said base is placed on a first surface and said tool is used to verify the planarity of a second surface with respect to said first surface, said planarity verification tool having a calibration mode wherein said planarity indicator can be used to verify that said planar side of said base is perpendicular to said axis of rotation of said rotating element.

3. The planarity verification tool of claim 2 further comprising:

a threaded nut, said threaded nut screwed onto said end of said axle, said threaded nut applying and maintaining compressive force on said first thrust bearing assembly between said nut and said lower surface of said shelf, and a snap ring located in a groove in said axle, said groove being located in a second end of said axle, said snap ring applying and maintaining compressive force on said second thrust bearing assembly between and said snap ring and said upper surface of said shelf.

4. A planarity verification tool, comprising:

a base having a planar reference surface, a rotating element having a first axis of rotation, said rotating element comprising a means for generating a first electronic signal indicative of an angular position of said rotating element, an adjustable connection means for connecting said rotating element to said base, an indicator means for indicating variations in a surface, said indicator means comprising a means for generating a second electronic signal indicative of the variations in the surface, a transmitter for transmitting said first electronic signal and said second electronic signal to a receiver, and an attachment means for attaching said indicator means to said rotating element.

5. The planarity verification tool of claim 4 wherein said adjustable connection means permits adjustment of an orientation of said first axis of rotation with respect to said planar reference surface about a second axis and about a third axis.

6. The planarity verification tool of claim 4 wherein said adjustable connection means has three points of connection to said base, including a first point which is a pivotal connection, a second point which is a linearly adjustable connection, and a third point which is a linearly adjustable connection.

7. The planarity verification tool of claim 4 wherein said planar reference surface is a planar bottom surface of said base, and said attachment means is configured for selectively positioning said indicator means in contact with said planar bottom surface.

8. The planarity verification tool of claim 4 wherein said rotatable element is configured to enable said indicator means to rotate at least approximately 180 degrees with said indicator means in contact with said planar reference surface.

9. The planarity verification tool of claim 7 wherein said rotatable element is configured to enable said indicator means to rotate at least approximately 210 degrees with said indicator means in contact with said planar reference surface.

10. The planarity verification tool of claim 7 wherein said rotatable element is configured to enable said indicator means to rotate at least approximately 360 degrees with said indicator means in contact with said planar reference surface.

11. The planarity verification tool of claim 4 wherein said rotatable element is configured to maintain said indicator means at a fixed height with respect to said planar reference surface while rotating about said first axis of rotation.

12. The planarity verification tool of claim 4 further comprising a means for electronically recording said first electronic signal and said second electronic signal.

13. The planarity verification tool of claim 4 further comprising a means connected to said receiver for electronically recording said first electronic signal and said second electronic signal.

14. A method for operating a planarity verification tool, comprising:

providing a planarity verification tool, comprising:

a base having a planar reference surface, said planar reference surface being a planar bottom surface of said base, a rotating element having an axis of rotation, an adjustable connection means for connecting said rotating element to said base, an indicator means for indicating variations in a surface, and an attachment means for attaching said indicator means to said rotating element, said attachment means being configured for selectively positioning said indicator means in contact with said planar bottom surface, positioning said indicator means for indicating variations in a surface in contact with said planar reference surface; and rotating said indicator means about said axis of rotation with said indicator means in contact with said planar reference surface to indicate relative perpendicularity of said axis of rotation with respect to said planar reference surface.

15. The method of claim 14 further comprising:

adjusting an orientation of said axis of rotation with respect to said planar reference surface so as to improve the relative perpendicularity of said axis of rotation with respect to said planar reference surface; and rotating said indicator means about said axis of rotation with said indicator means in contact with said planar reference surface to verify the relative perpendicularity of said axis of rotation with respect to said planar reference surface.

16. The method of claim 14 further comprising:

placing said planar reference surface against a first surface;

positioning said indicator means in contact with said first surface; and rotating said indicator means about said axis of rotation with said indicator means in contact with said first surface to indicate the relative planarity of said first surface.

17. The method of claim 14 further comprising:

placing said planar reference surface against a first surface;

positioning said indicator means in contact with a second surface; and rotating said indicator means about said axis of rotation with said indicator means in contact with said second surface to indicate whether said second surface is parallel to said first surface.

* * * * *